United States Patent [19]

Johnson et al.

[11] 4,404,843
[45] Sep. 20, 1983

[54] CRYOGENIC STORAGE TANK LEAK DETECTION SYSTEM

[75] Inventors: Irvin D. Johnson, Englewood, Colo.; Gary M. Timlin, Kenai, Ak.; Robert D. Yuill, Yokohama, Japan

[73] Assignee: Marathon Oil Company, Findlay, Ohio

[21] Appl. No.: 284,756

[22] Filed: Jul. 20, 1981

[51] Int. Cl.³ ............................................. G01M 3/32
[52] U.S. Cl. ...................................... 73/49.2; 73/40.7
[58] Field of Search ................................ 73/49.2, 40.7

[56] References Cited

U.S. PATENT DOCUMENTS

| | | |
|---|---|---|
| 3,347,402 | 10/1967 | Forman et al. |
| 3,413,840 | 12/1968 | Basile et al. |
| 3,489,311 | 1/1970 | Folkerts et al. ............... 73/49.2 X |
| 3,659,543 | 5/1972 | Basile et al. |
| 3,908,468 | 9/1975 | Katsuta et al. |
| 3,913,341 | 10/1975 | Katsuta ........................ 73/40.7 X |
| 3,919,855 | 11/1975 | Turner |
| 3,921,438 | 11/1975 | Katsuta ........................ 73/49.2 X |
| 4,104,906 | 8/1978 | Oertle |
| 4,135,386 | 1/1979 | Peterson et al. |

FOREIGN PATENT DOCUMENTS

2317649  2/1977  France ............................ 73/40.7

Primary Examiner—E. R. Kazenske
Assistant Examiner—Joseph W. Roskos
Attorney, Agent, or Firm—Jack L. Hummel

[57] ABSTRACT

The invention provides a system for the detection of leaks in the primary barrier (150), the secondary barrier (130), and the inner hull (110) of the primary and secondary insulation spaces (140 and 120) of a cryogenic cargo tank (10) carrying liquified natural gas in a transport ship (20) wherein an inert gas is maintained at a first predetermined pressure ($P_{NP}$) in the primary insulation space (140) which is less than the pressure of the cargo gas ($P_{CH_2}$) and wherein the inert gas is maintained at a second predetermined pressure ($P_{NS}$) in the secondary insulation space (120) so that the second predetermined pressure ($P_S$) is less than the first predetermined pressure ($P_{NP}$) and is also less than atmospheric pressure ($P_O$). A gas sensor (930) is placed in the primary insulation space (140) to detect any leaks in the primary barrier (150) and a sensor (940) is placed in the secondary insulation space (120) to detect the presence of any oxygen due to a leak in the hull (110). The flow of the inert gas into and out from both the primary and secondary spaces (140 and 120) over a period of time is measured and any differences in the flow rates in and the flow rates out of each of the insulation spaces is detected. Any differences in the flow rates is indicative of a leak occurring in the secondary barrier and is further indicative of the size of the leak.

15 Claims, 11 Drawing Figures

CRYOGENIC STORAGE TANK LEAK DETECTION SYSTEM

TECHNICAL FIELD

The present invention relates to a system for detecting leaks in cryogenic storage tanks and, more particularly, to a system for detecting leaks in the secondary barrier between the primary and secondary insulation spaces of the wall of the storage tank and for determining the approximate size of the leak while the tank is in operation.

BACKGROUND ART

A novelty search directed towards systems for detecting leaks in cryogenic storage tanks uncovered the following prior art:

| Inventor | U.S. Pat. No. | Issue Date |
| --- | --- | --- |
| C. D. Forman et al | 3,347,402 | Oct. 17, 1967 |
| N. K. Basile et al | 3,413,840 | Dec. 3, 1968 |
| Basile et al | 3,659,543 | May 2, 1972 |
| Katusuta et al | 3,908,468 | Sept. 30, 1975 |
| Turner | 3,919,855 | Nov. 18, 1975 |
| Oertle | 4,104,906 | Aug. 8, 1978 |
| Peterson et al | 4,135,386 | Jan. 23, 1979 |

The 1967 patent issued to Forman et al (U.S. Letters Patent No. 3,347,402) sets forth a cryogenic storage tank having a single insulation space pulled to a vacuum surrounded by insulating material. A monitor is placed in the primary insulating space which is adapted to detect the presence of cargo gas which would be indicative of a leak in the primary barrier.

The 1968 patent issued to Basile et al (U.S. Pat. No. 3,413,840) relates to a leak detection system for liquified gas storage tanks. The Basile leak detection system has for its goal the detection of leaks in the primary barrier of a cargo tank having a primary insulation space. The primary insulation space is filled with inert gas and is maintained at a pressure slightly less than the cargo gas pressure within the tank. The leak detection system of Basile senses both pressure and temperature in the primary insulation space and generates a calculated pressure which is then compared to the actual pressure expected. If a leak exists, the pressure in the primary insulation space will increase.

The 1972 patent issued to Basile et al (U.S. Pat. No. 3,659,543) sets forth a ship for transporting cryogenic material utilizing a cargo tank surrounded by a primary insulating space which is surrounded by the inner hull of the ship. Around the inner hull, is provided a cofferdam space. Inert gas is circulated in both the primary insulating space and the cofferdam space by means of two separate circulation systems of different inert gases. Leaks in either the primary barrier or the inner hull, will result in a leak of either the cargo gas or the inert gas which can be detected by means of a gas sensor or by a pressure buildup.

The 1975 patent issued to Katsuta et al (U.S. Letters Pat. No. 3,908,468) relates to a storage tank leak detector utilizing two electrically conductive layers creating a predetermined capacitance so that any leakage of the stored fluid will change the capacitance between the layers thereby indicating the leak.

The 1975 patent issued to Turner (U.S. Pat. No. 3,919,855) relates to the storing of an inert gas in the primary insulation space at a pressure sufficiently above atmospheric pressure to assure that any leakage occurring through the primary barrier or inner skin is only gas from the chamber to the contents in the tank and not vice versa.

The 1978 patent issued to Oertle (U.S. Pat. No. 4,104,906) relates to a crack detection arrangement utilizing a strain gauge sensor.

The 1979 patent issued to Peterson et al (U.S. Pat. No. 4,135,386) also relates to a system for monitoring early formation of cracks in permeable or porous materials.

In view of the prior art uncovered, two basic approaches for leak detection are presented. First, and as shown in the Forman et al patent, a gas monitor or detector is placed in an insulating space filled with an inert gas to detect any presence of the gas being stored in the cryogenic tank. If no leaks are present, no cargo gas would be present in the insulating space. Secondly, a differential pressure measurement can be made as set forth in the Basile et al U.S. Pat. No. (3,413,840) wherein the pressure of the inert gas in the insulation space is measured and kept slightly less than the cargo gas pressure within the tank. In the event that a leak occurs in the primary barrier, the pressure of the primary insulation space increases and this pressure, when corrected with temperature, is indicative of the leak.

For cryogenic storage tanks having primary and secondary insulation spaces, there is no known technique for detecting a leak in the secondary barrier where both insulating spaces utilize the same inert gas. For example, placing a gas monitor in the secondary insulation space would only detect the cargo gas in the highly improbable event of a leak occurring in both the primary and secondary barriers. Such a monitor would not detect a leak in the secondary barrier if no leak existed in the primary barrier. The use of two different inert gases are suggested by Basile et al, resulting in a costly approach requiring two sources of supply of inert gas.

To date, the only practical procedure for detecting leaks in the secondary barrier is to empty the storage tank, by removing the liquified natural gas, warming the storage tank up, and pulling a vacuum on the secondary insulation space. For a conventional tanker, having six cargo tanks, this process of verifying the existence of leaks and repairing those leaks takes from seven to ten days at a considerable cost in down time. Furthermore, such dry-docking inspections run the risk of causing leaks to occur in the primary and secondary barriers.

Finally, none of the prior art sets forth an approach for determining the approximate size of a leak.

DISCLOSURE OF INVENTION

The problem faced in detecting leaks in the secondary barrier between the primary and secondary insulation spaces of cryogenic storage tank is to design a system which can detect leaks, and the approximate size of the leaks, occurring in the secondary barrier while liquified natural gas is being stored in the cargo tank or, in the case of a cargo tanker, while the ship is in transit to its destination without the necessity of dry-docking.

The cryogenic leak detection system of the present invention provides a solution to the problem and includes the use of the same type of inert gas in both the primary and secondary insulation spaces wherein the gas is applied and maintained at set pressures in the primary and secondary insulation spaces by separate header and exhaust systems and wherein the pressure in the secondary insulation system is maintained at a different pressure than the pressure of the primary insulation space. A leak occurring in the secondary barrier will then permit the inert gas to flow from the high pressure insulation space to the low pressure insulation space. By monitoring the flow of inert gas into and out from each insulation space over a predetermined period of time, the presence of any leak can be detected by changes in the flow and the approximate size of the leak can be ascertained based upon the differential flow calculated.

BEST MODE FOR CARRYING OUT THE INVENTION

1. General Description

Figure 1:
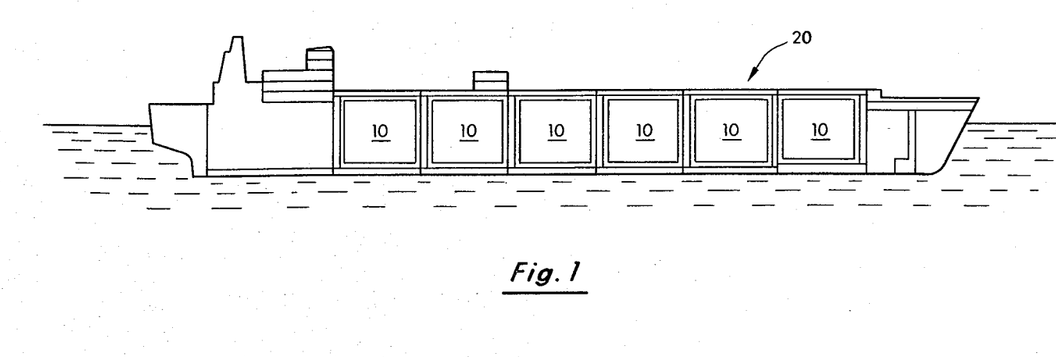
FIG. 1 is an illustration, in cross-section, of a tanker carrying six cargo tanks of liquified natural gas.

In FIG. 1 is shown, in cross-section, six liquid natural gas cargo tanks 10 contained in a transport ship 20. Each of the cargo tanks 10 can store liquid natural gas such as methane ($CH_4$) in quantities of approximately 10,000 cubic meters. The methane is transported in cryogenic temperatures.

Figure 2:
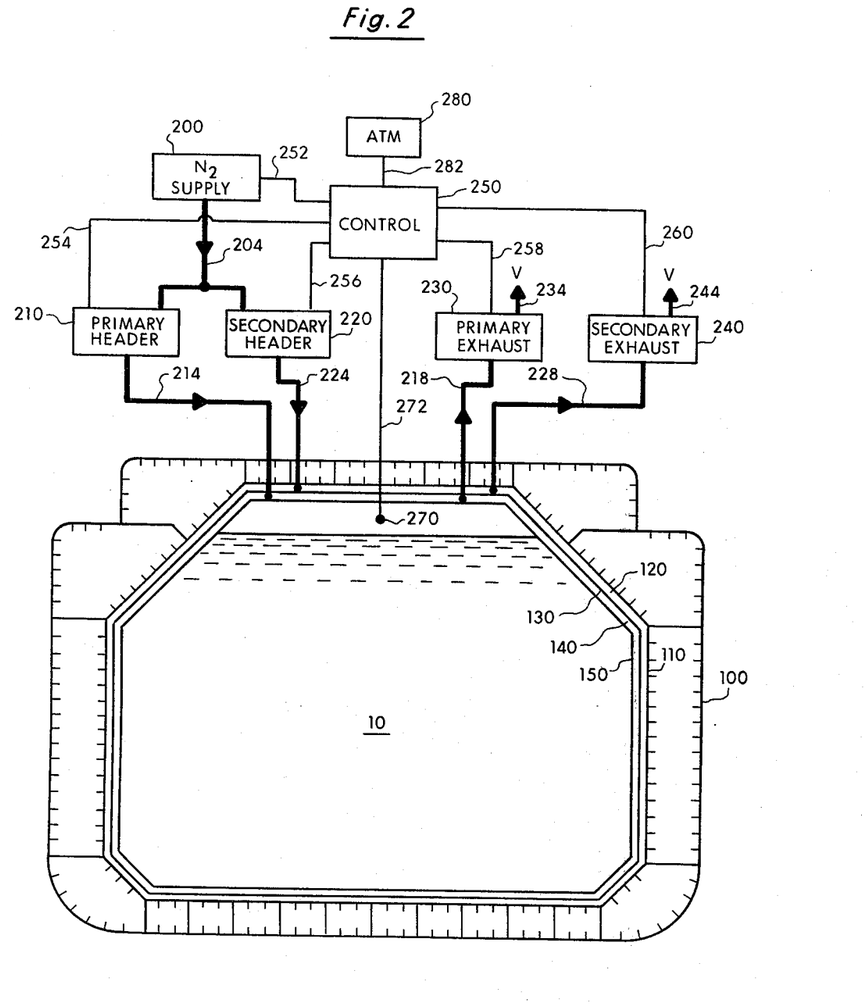
FIG. 2 is an illustration, in cross-section, of a cargo tank having nitrogen supplied to the primary and secondary insulation spaces incorporating the leak detection system of the present invention, shown in block diagram format.
Figure 3:
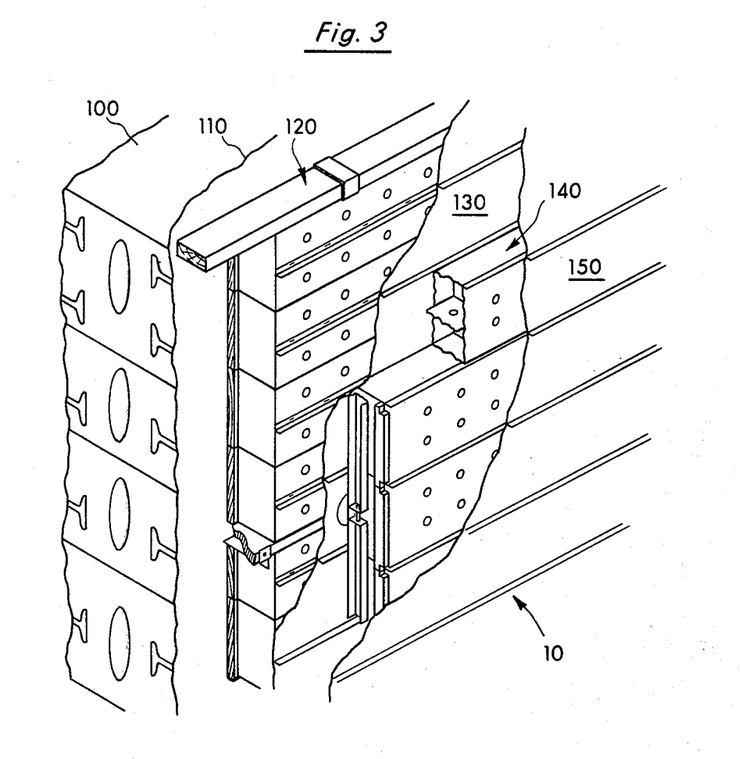
FIG. 3 is a cut-away representation of a sidewall of the cargo tank showing the primary and secondary insulation spaces.

In FIGS. 2 and 3, the details of an individual cargo tank 10 are set forth and includes an outer hull 100, and inner hull 110, a secondary insulation space 120, a secondary barrier 130, a primary insulation space 140, and a primary barrier 150. The primary and secondary insulation spaces 140 and 120, respectively, are filled with insulating material. The primary and secondary barriers 150 and 130, respectively, are manufactured from a material commercially known as INVAR a generic alloy having a content of approximately 63% Fe, 36% Ni, 0.4% C, 0.25% Si, 0.05 S.

As mentioned, the primary and secondary insulation spaces, 140 and 120, are conventionally filled with an inert gas such as nitrogen ($N_2$). In conventional installations, the nitrogen gas is delivered into both the primary and secondary insulation spaces 140 and 120 as one continuum. In such conventional installations, the insulated spaces, 140 and 120, are filled with nitrogen gas which flows from the source of the nitrogen into the cargo tank's primary insulated spaces 140 and secondary insulated spaces 120.

The leak detection system of the present invention is shown in FIG. 2 to include a supply of nitrogen 200 and header piping 204 delivering nitrogen gas into a primary header control 210 and a secondary header control 220. The nitrogen gas is delivered from the primary header control 210 over header piping 214 into the primary insulation space 140. The nitrogen gas is also delivered from the secondary header control 220 over header piping 224 into the secondary insulation space 120. The nitrogen gas is exhausted from the primary insulation space 140 through header piping 218 into the primary exhaust control 240 and then through piping 234 into a vent, V, for delivery into the atmosphere. The nitrogen gas in the secondary insulation space 120 is exhausted over piping 228 into a secondary exhaust control 240 which in turn vents the gas through piping 244 into a vent V to the atmosphere.

As will be discussed in greater detail, the present invention utilizes totally separate header and exhaust systems for the primary and secondary insulation spaces, 140 and 120. Not only are the two supply systems separate from each other, but according to the teachings of the present invention, the nitrogen pressure in each insulation space is substantially different.

Within the nitrogen supply 200, the primary header control 210, the secondary header control 220, the primary exhaust 230, and the secondary exhaust control 240, are sensors and control valves which communicate with a central control 250 over leads 252, 254, 256, 258, and 260 as shown in FIG. 2. The central control 250 measures the temperature and pressure of the supply 200 as well as the temperatures and pressures of the nitrogen gas at the primary and secondary exhausts 230 and 240. The central control also measures the flow rates of the nitrogen gas flowing into and out from the primary and secondary insulation spaces. Finally, the central control 250 measures the vapor pressure of the methane in each cargo tank 10 by means of a sensor 270 over lead 272 and further measures the atmospheric pressure with sensor 280 over leads 282.

The leak detection system of the present invention performs a number of functions in order to detect leaks. Each of these will be discussed in reference to FIGS. 4 through 6.

Figure 4:
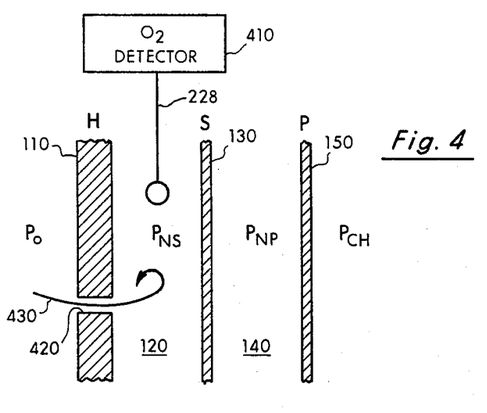
FIG. 4 is an illustration showing the detection of a leak in the hull of the tanker letting in oxygen to the secondary insulating space.

In FIG. 4, a sample of the nitrogen gas, existing in the secondary insulation space 120 is delivered over piping 228 into an oxygen ($O_2$) detector 410. In the event there is a leak in the hull 110, oxygen in the atmosphere, $P_o$, will be delivered through the leak area 420 and into the secondary insulation space 120 shown by arrow 430. Any oxygen present will be detected by oxygen detector 410 thereby signifying that the leak 420 has occurred.

Figure 5:
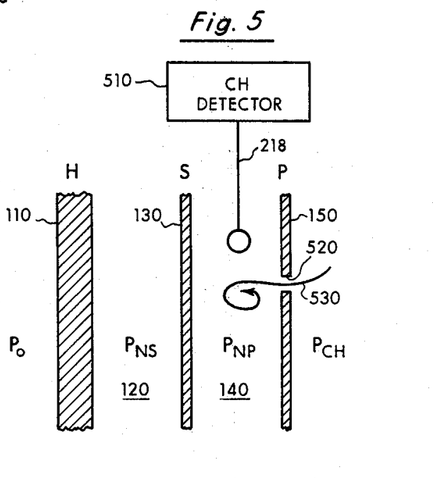
FIG. 5 is an illustration showing the detection of a leak in the primary barrier letting in liquified natural gas to the primary insulating space.

In FIG. 5 a sample of the nitrogen gas, existing in the primary insulation space 140 is delivered into piping 218 and into a methane ($CH_4$) detector 510. The presence of methane in the primary insulation space 140 can only be due to the presence of a leak in area 520 which permits methane gas to flow in as indicated by arrow 530. The methane detector 510 will detect the presence of the methane gas thereby signifying that a leak has occurred.

The tests for the leaks shown in FIGS. 4 and 5 are suitable for detecting the presence of leaks in the hull 110 and the primary barrier 150, but not for those leaks occurring in the secondary barrier 130.

Figure 6:
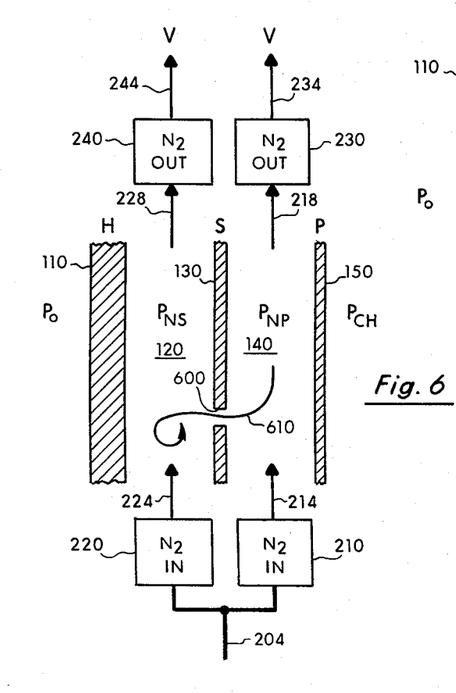
FIG. 6 is an illustration showing a leak in the secondary barrier between the primary and secondary insulating spaces letting in pressurized nitrogen gas from the primary insulating space into the secondary insulating space.

Under the teachings of the present invention and as shown in FIG. 6, the pressure of the nitrogen gas, $P_{NP}$, in the primary insulation space 140 is greater than the pressure of the nitrogen gas, $P_{NS}$, in the secondary insulation space 120. When no leaks are present in the secondary barrier 130, the two pressurized spaces 120 and 140 are at their respective pressures and the flow rate of the nitrogen gas into each respective insulation space should equal the flow rate of the gas out of that space. In the event of a leak 600 in the secondary barrier 130, nitrogen gas, $P_{NP}$, is delivered from the primary insulation space 140 into the secondary insulation space 120 as indicated by arrow 610. When that occurs, an additional flow of nitrogen gas will be added into the secondary insulation space 120 and this additional gas upon flowing out the secondary exhaust 240, can be measured. Likewise, the gas that leaves the primary insulation space results in less flow of nitrogen gas in that space which will be detected under the teachings of the present invention. Hence, by knowing the flow rates in and out of each insulation space and correcting the flow rates for pressure and temperature changes, the presence of any leaks can be accurately detected. Under the teachings of the present invention, a leak as small as one-half of a millimeter in a secondary membrane can be detected. To put this in perspective, the primary and secondary barriers, 130 and 150 are typically one-half of a millimeter thick. The insulation spaces 120 and 140 are each approximately 20 centimeters thick. As mentioned, typical volumes of a cargo tank are approximately 10,000 meters.

2. Detailed Description

Figure 7:
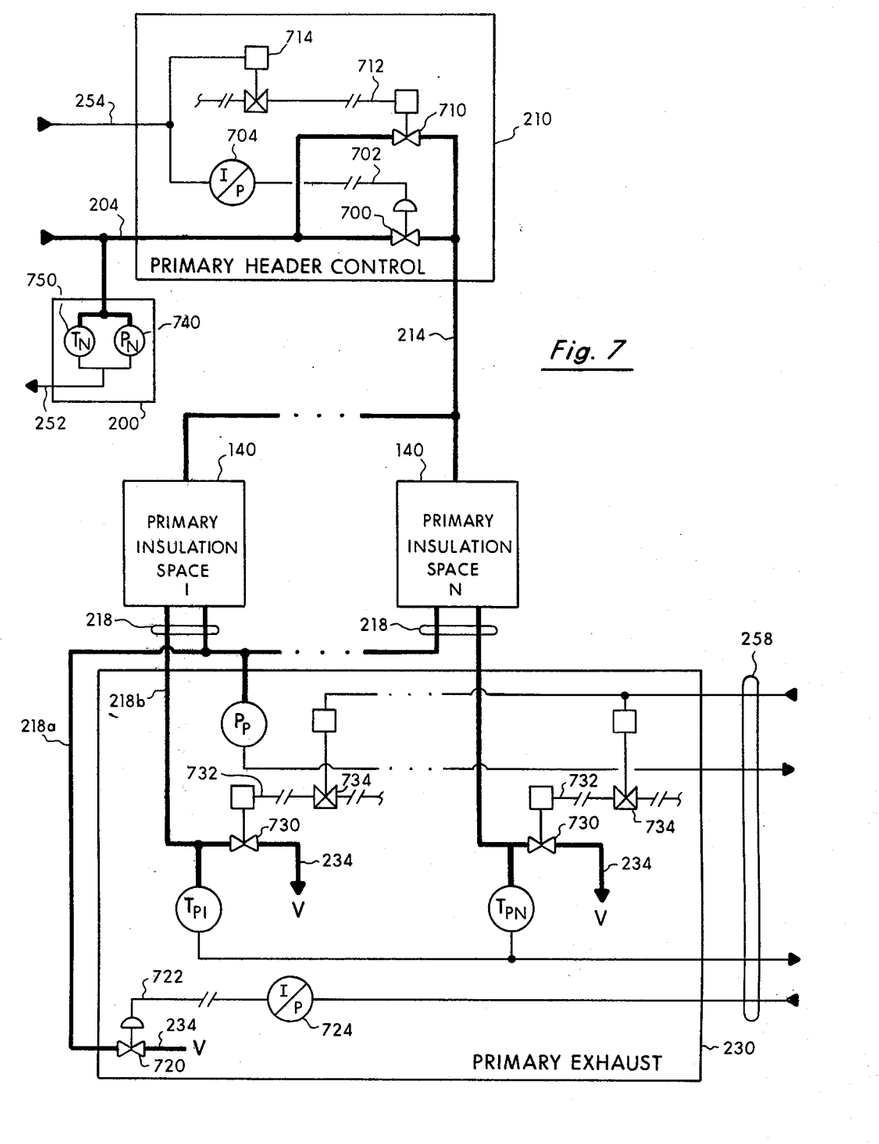
FIG. 7 is a diagram detailing the independent nitrogen control system for providing nitrogen gas into the primary insulation space.

In FIG. 7, the present invention as it relates to supplying nitrogen gas to the primary insulation space 140 is shown. Nitrogen is conventionally supplied into supply line 204 which accesses the primary header control 210. In the primary header are two valves 700 and 710. Each valve is pneumatically activated over line 700 and 712, respectively to prevent the presence of electricity near the methane load. The pneumatic activation is, in turn, activated by electric controls 704 and 714 respectively. Electric controls 704 and 714, are in turn, under command by the control unit 250 over leads 254.

The valves 700 and 710 operate as follows. Assume an initial nitrogen header pressure in line 214 of zero. Both valves 700 and 710 will be fully opened. Both valves permit nitrogen to flow into the cargo tank primary insulation space 140 in order to increase the pressure therein. As the pressure in the primary insulation space 140 slowly rises, valve 700 will begin to close. At a pressure of approximately 2.5 GM/CM in the preferred embodiment, valve 700 fully closes. Valve 710, however, remains open until the pressure rises to approximately 5.0 gm/cm², in the preferred embodiment. At this pressure, valve 710 will close and remain closed until the pressure again decreases to 3 gm/cm² or less. Valve 710 has been appropriately sized when opened to cause the pressure in the primary insulation space 140 to increase at a rate of 1 gm/cm² per ten minutes.

The nitrogen pressure in the primary insulation space 140, in the preferred embodiment, valve 700 is preferably a Honeywell one inch valve having a CV of 2.92, a nominal differential pressure of 4.92 kilograms/cm², and a rate (full open) of 275 cubic meters per hour. Valve 710 is preferably a Jordan solenoid valve having a size opening of one-half inch, a CV of 0.4, a nominal differential pressure of 3.3 gm/cm², and a flow rate (full open) of 30.6 cubic meters per hour.

The purpose in utilizing two valves is to rapidly fill the primary insulation space 140 initially at a greater rate and then having valve 700 turn off to make the completion of the filling primary insulation space 140 at a much slower rate.

The nitrogen gas is exhausted from the preliminary insulation space through piping 218 which enters the primary exhaust control 230. Pipe 218A inputs valve 720 which is pneumatically controlled over line 722 by electric control 724. Electric control 724 receives its command signals over bus 258 from the control unit 250. Valve 720 is preferably manufactured by Masoneilen and is a three inch valve having a CV of 135, a differential pressure of 5 gm/cm² and a flow rate (full open) of 200 cubic meters per hour. If the pressure in the primary insulation space 140 increases to 7.5 gm/cm², the control valve 720 will begin to open and will be 100 percent open when the pressure is 10 gm/cm². When valve 720 reaches 81 percent of its full opening, a high pressure alarm, not shown, is activated by the control unit 250. Exhaust pipe 218A also accesses pressure sensor $P_P$ to measure the pressure in the exhaust line and delivers signal over bus 258 to the control unit 250.

The nitrogen in line 218A also inputs a temperature sensor, $T_P$ which monitors the temperature of the nitrogen from the primary insulation space 140. The temperature sensor is a conventional thermocouple which generates an electrical signal to bus 258 indicative of the valve of the temperature of the nitrogen gas exiting space 140. As illustrated in FIG. 7, the temperature in each primary insulation space 140 is ascertained separately.

The nitrogen in the exhaust line 218A, also accesses a valve 730 which is pneumatically controlled over line 732 by an electric control 734 which receives commands from the control 250 over bus 258. There is a separate valve 730 for each of primary insulation space 140. All valves 730 are preferably manufactured by Jordan as a one inch valve, a CV of 2.5, a differential pressure of 5 gm/cm², and a flow rate (full open) of 4.5 cubic meters per hour.

Figure 10:
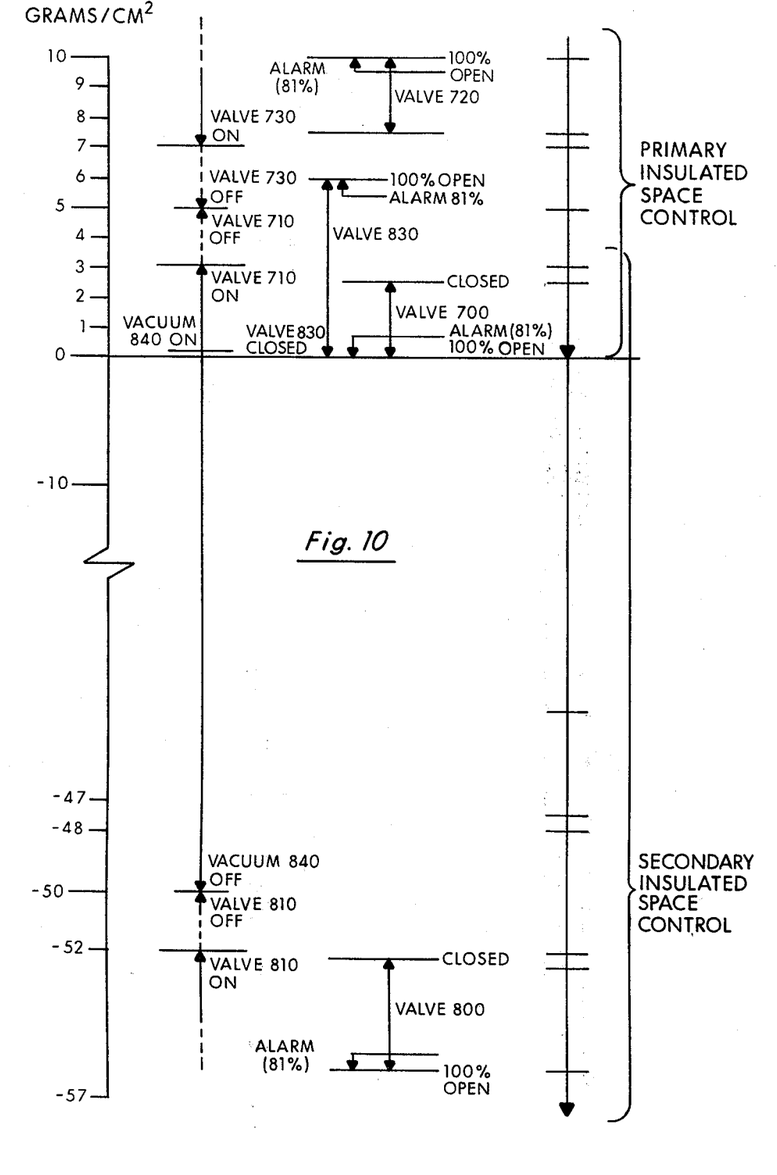
FIG. 10 is a chart setting forth the pressure operation of the various valves and alarms in the control system of the present invention.

In operation and as illustrated in FIG. 10, if the pressure in the primary insulation spaces 140 rises above 7 gm/cm², valves 730 will all open, exhausting the primary insulation spaces 140 until the pressure therein decreases to 5 gm/cm². In this fashion, valves 730 regulate the pressure in the primary insulation space 140 whereas valve 720 provides an emergency exhaust when pressure builds up.

In this fashion, the pressure in the primary insulation space 140 is controlled at a pressure of 5 gm/cm² plus or minus 2 gm/cm², providing that the cargo tank's vapor pressure is above 15 gm/cm². If the vapor pressure is below 15 gm/cm², then primary insulation spaces 140, will be controlled at a pressure 10 gm/cm² below the cargo tank's vapor pressure until atmospheric pressure is reached. An alarm will be activated whenever the primary insulation space pressure is below 1.5 gm/cm$^2$. This is accomplished by means of pressure sensor P$_P$ and temperature sensor T$_{P1}$-T$_{PN}$ on the primary header line 204. The electrical signals generated by these sensors are sent to the control unit 270 over bus 252. Finally, a high-nitrogen-flow alarm will be activated if valve 700 reaches 81 percent of its full opening.

Figure 8:
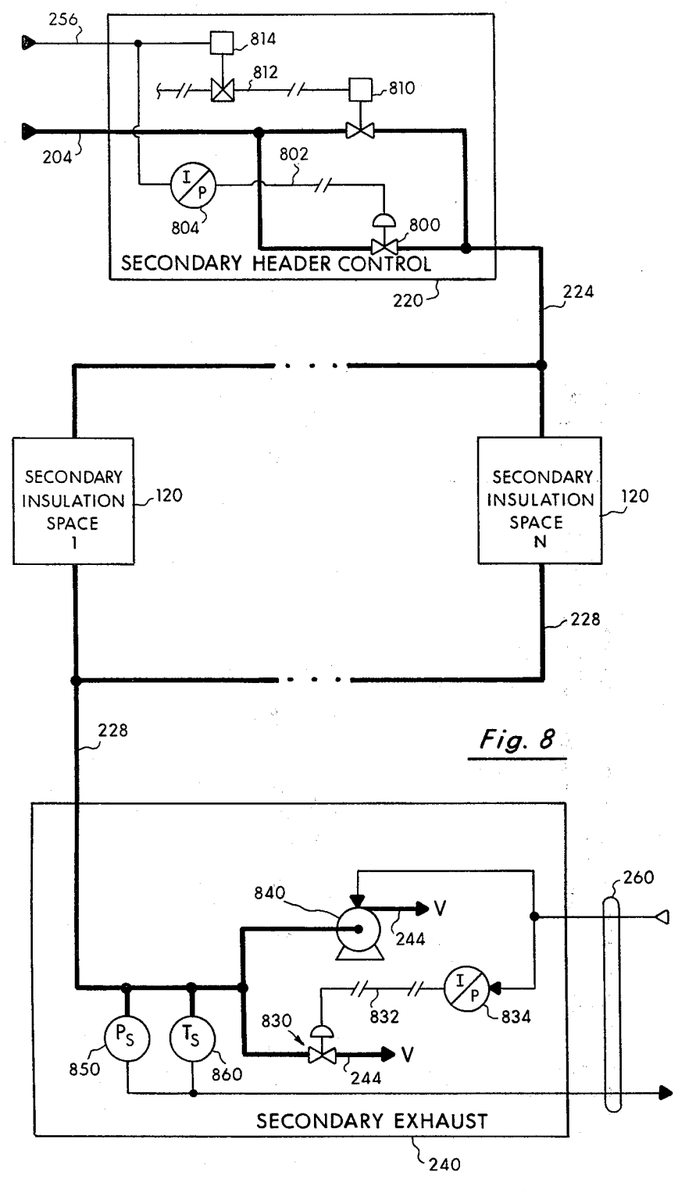
FIG. 8 is a diagram of the independent nitrogen supply system for providing nitrogen gas into the secondary insulation space.

In FIG. 8, the details of the nitrogen supply system for maintaining the secondary insulation space 120 at a pre-set pressure is detailed. The nitrogen supply header 204 is delivered into the secondary header control 220 and specifically into valves 800 and 810. Valve 800 is pneumatically controlled over line 802 by an electric control 804 which in turn receives commands from the control unit 250 over bus 256. Likewise, valve 810 is pneumatically controlled over line 812 by electric control 814 which also receives commands over bus 256 from control unit 250. Valves 800 and 810 function like valves 700 and 710 of FIG. 7 in that and with reference to FIG. 10, both valves are initially on until valve 800 reaches a pressure of approximately 52 gm/cm$^2$ at which time it is fully closed. Valve 810 continues to be on until the set point of $-50$ gm/cm$^2$ is reached. Valve 800 is preferably a Honeywell one inch valve having a CV of 127, a nominal differential pressure of 4.92 gm/cm$^2$, and a flow rate (full open) of 176 cubic meters per hour. Valve 810 is preferably manufactured by Jordan as a one-half inch valve having a CV of 0.42, a differential pressure of 3.3 Kgm/cm$^2$, and a flow rate (full open) of 30.6 cubic meters per hour.

The nitrogen delivered by valves 800 and 810 flow through pipe 224 into the secondary insulation spaces 120. The nitrogen is exhausted from the secondary insulation spaces 120 through exhaust headers 228 which access a pressure sensor (P$_S$) 850 and a temperature sensor (T$_S$) 860 which deliver signals proportional to the pressure and temperature in the exhaust header line 228 over bus 260 to the control unit 250. Exhaust header pipe 228 also accesses valves 830 and vacuum pump 840. Valve 830 is an emergency exhaust or vent valve which operates to open when the nitrogen pressure in the secondary insulation spaces exceeds atmospheric pressure as shown in FIG. 10. Vacuum pump 840 is required to pull a vacuum on the secondary insulation spaces 120 in order to maintain the pressure set point in the secondary insulation space 120 of $-50$ gm/cm$^2$. If the pressure in the secondary insulation space 120 rises above the set point value, the vacuum pump 840 is operated to pull the pressure back down to set point value. The excess nitrogen gas is exhausted over line 244 to a vent V. The vacuum pump 840 is electrically controlled by means of an electric control 844 which receives its commands over bus 260 from the control unit 250.

In summary, and with reference to FIG. 10, vacuum pump 840 functions to pull a vacuum on the secondary insulation space 120 until a set point value is reached. Any changes in pressure may require the operation of the valves 800 or 810 or the operation of vacuum pump 840 to maintain the set point pressure.

It is to be expressly understood, that the set point of $-50$ gm/cm$^2$ could be any other suitable value. For example, rather than pulling a vacuum on the secondary insulation space, the pressure in the secondary insulation space could be, for example, 30 gm/cm$^2$. In this case, a vacuum pump 840 would not be utilized. Rather, vacuum pump 840 would be replaced by a suitable valve as set forth in FIG. 7 for the primary insulation spaces. The importance here is to establish a differential pressure between the primary and secondary insulation spaces.

It is preferred to have the pressure in the primary space be below the pressure of the gas in the cargo tank while being greater than the pressure of the nitrogen gas in the secondary insulation space. In this manner, gas from the cargo tank, in the event of a leak in the primary barrier, will flow into the primary insulation space and be detected by the methane detector therein and with the pressure in the secondary space being less than the atmospheric pressure, a leak in the inner hull, will permit oxygen from the atmosphere into the secondary insulation space for detection by an oxygen detector. Hence, leaks in the primary barrier 150, the secondary barrier 130, and the inner hull 110 will be detected by the control unit 250 of the present invention.

Figure 9:
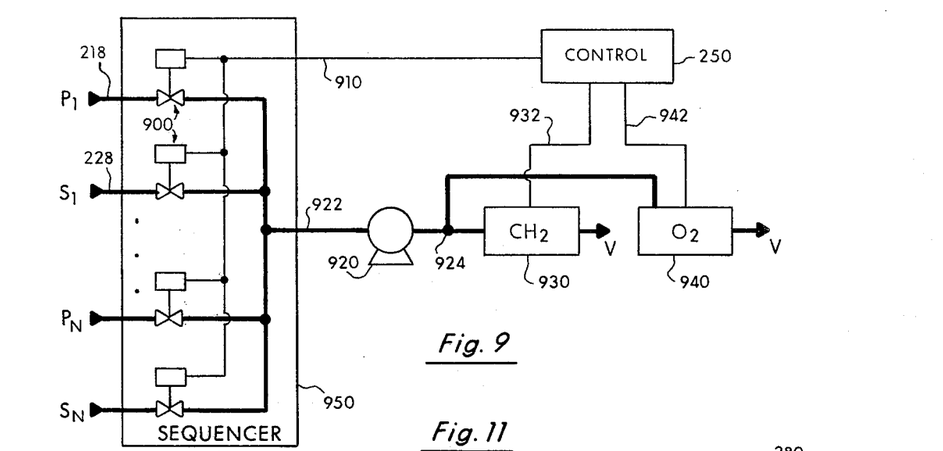
FIG. 9 is a diagram detailing the measurement of the methane and oxygen content in the primary and secondary insulation spaces.

In FIG. 9, the details of the methane (CH$_4$) and the oxygen (O$_2$) monitoring system are set forth. A supply line 218 from the primary insulation space P$_1$ and a supply line 228 from the secondary insulation space S$_1$ access a pair of solenoid control valves 900 which are controlled by commands on bus 910 from the control unit 250. Shown in FIG. 9 is a plurality of lines 218 and 228 accessing each of the primary and secondary insulation spaces for each cargo tank 10. The supply lines are commonly tied together with pipe 922 which accesses a vacuum pump 920 which delivers the gases contained in pipe 922 through pipe 924 to the methane analyzer 930 and to the oxygen analyzer 940. These analyzers are in turn controlled over lines 932 and 942 by control unit 250. Valves 900 form part of a sequencer termed 950.

In operation, the control unit 250 sequences one control valve 900 at a time. For example, control valve 900 on line 218 is selectively activated and for a period, such as, three minutes, the gas in the primary insulation space is pumped through line 218 to line 922 by vacuum pump 920 and the gases are analyzed for any methane or oxygen content therein. If such is detected, appropriate signals and the next control valve is activated. In the case of six tanks, a total of twelve control valves 900 are present and the total sequencing time is thirty-six minutes. Hence, every thirty-six minutes, the gas in an insulation space is sampled for methane or oxygen content.

Figure 11:
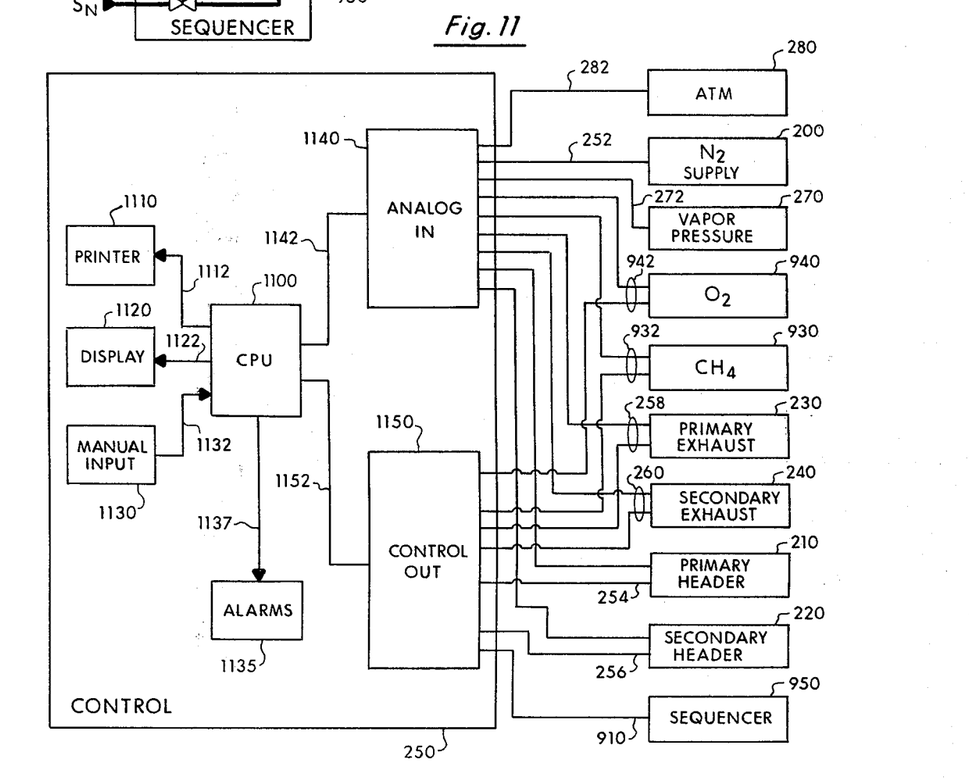
FIG. 11 is a schematic block diagram setting forth the details of the control of the present invention.

In FIG. 11, the details of the control unit 250 are set forth to include a central processing unit 1100 in communication with a printer 1110 over bus 1112, a display 1120 over bus 1122, a manual input circuit 1130 over bus 1132, a set of alarms 1135 over bus 1137, an analog input circuit 1140 over bus 1142 and a control output circuit 1150 over bus 1152. The control unit 250 is conventionally programmed and constructed and may comprise a number of different configurations. The control unit 250 selectively interfaces with a number of peripheral units as previously fully described and explained. The analog-in circuit 1140 is responsible for receiving incoming signals such as, for example, signals on bus 282 representative of atmospheric pressure from atmospheric pressure sensor 280. Control out unit 1150 is responsible for performing tasks for peripheral units such as, for example, controlling the sequencer 950 over bus 910 to selectively perform the oxygen and methane tests.

3. Operation

In the test procedure shown in FIG. 6, the existence of potential leaks in the secondary barrier 130 and, even the approximate size of the leak, can be detected by utilizing the system of the present invention by measuring the standard cubic meters of nitrogen flowing into and out of the primary and secondary insulation spaces. As shown in FIG. 10, a pressure difference of approximately 55 gm/cm² exists across the secondary barrier 130, as shown in FIG. 6. The flow measurements are made by measurement of the pressure differential across the calibrated interval orifices found in valve 810 which is the inlet for the nitrogen in the secondary header control 220, valve 710 which is the inlet for the nitrogen in the primary header control 210, valves 730 which are the outlet exhaust valves in the primary exhaust control 230, and the vacuum 840 which is the secondary exhaust control 240. These orifices provide accurate measurements of the nitrogen flows based upon the operation of the valves and the vacuum pump.

Hence, with reference back to FIG. 6, by measuring over a period of time the flow of the nitrogen into both the primary and secondary insulation spaces 140 and 120, and by measuring the flow out from these spaces over the same period of time, it can be readily determined whether or not the flow into the primary insulation space equals the flow out from the space. In the event there are no leaks, the flows should be equal. However, in the event that a leak 600 exists, then the flow out of the primary insulated space 140 will be less than what is flowing in. Likewise, when no leaks exist the flow of nitrogen into the secondary insulation space 120 should equal the flow out of the secondary insulation space. In the event of a leak 700, the flow out will be greater than what is flowing in. This technique lets the leak flow accumulate over a period of time during which period of time the pressures are maintained in the insulation spaces.

Temperature corrections are made to the flow measurements by temperature measurements provided by thermocouples $T_{P1}$-$T_{PN}$ (in the primary exhaust 230 of FIG. 7) and $T_S$ (in the secondary exhaust 240 in FIG. 7).

Pressure corrections are made by knowing the atmospheric pressure from sensor 280 (FIG. 2), the nitrogen supply pressure from sensor $P_N$ (FIG. 7) the primary insulated space pressure at $P_P$ (FIG. 7), and the secondary insulated space pressure $P_S$ (FIG. 8).

In making the flow measurements calculations, all flows are converted into standard cubic meters at 26° centigrade and one atmosphere (1032 gm/cm²).

The flow measurements are made only during the time period when valve 810 in the secondary header control 220, valve 710 in the primary header control 210, valve 730 in the primary exhaust control 230, and the vacuum 840 in the secondary exhaust control 240 can maintain the set point pressures (±2 gm/cm²) in the primary (i.e., 5 gm/cm²) and secondary (i.e., −50 gm/cm²) insulated spaces. In the event that any of the valves 800 in the secondary header control 220, 700 in the primary header control 210, 720 in the primary exhaust control 230 and 830 in the secondary exhaust control 240 are activated, the flow measurements are terminated. The time period for the measurement is held in the control unit 250 in order to calculate the average net rate of nitrogen into (or out of) both the primary and secondary insulation spaces.

Furthermore, no measurements for leak determination are taken during the time that the control valves are required for operation, such as during cool-down, cargo loading, or the time when the ship passes through a large barometric pressure change. In all other instances, the leak measurement tests are made, while the tanker is traveling between points of destination.

4. Typical Calculation

The following represents a typical calculation. Assume the volume of the primary insulation space equal to the volume of the secondary insulation space or 425 cubic meters per tank. If six cargo tanks are involved, the total volume of the primary and secondary insulation spaces is equal to 2,550 cubic meters. The following calculations are for all six tanks combined. For these calculations, a temperature of zero degrees centigrade and a pressure of one atmosphere of 1033.5 gm/cm² is assumed.

$$\left(\frac{\partial V}{\partial T}\right)_P = 6.37 \text{ m}^3/°\text{C}. \quad\quad 1.$$

with a constant methane tank temperature of −160° C., 1.062 m³ of gas for a single tank or 6.37 m³ for six tanks would have to be released from the primary insulation space for every 1° C. temperature rise at the inner hull in order to maintain the pressure in the space constant.

$$\left(\frac{\partial P}{\partial T}\right)_n = 1.4 \text{ gm/cm}^2/°\text{C. change at inner hull.} \quad 2.$$

With no leaks, a 1° C. change at the inner hull would cause 1.4 gm/cm² pressure increase in the primary insulation space if no gas were vented.

$$\left(\frac{\partial V}{\partial P}\right)_T = 4.46 \text{ m}^3/(\text{gm/cm}^2). \quad\quad 3.$$

If the temperature gradient did not change with time, then 4.46 m³ of gas would have to be admitted to the primary insulation space for every 1 gm/cm² pressure increase.

For example, a leak in one tank that would cause a vacuum loss than 20 gm/cm² at an initial vacuum of 800 gm/cm² is equivalent to a gain of 7.65 m³ N₂. If this loss is over a 10-hour period, this is a rate of 0.765 m³/hr. Since the flow rate is a function of the square root of the pressure drop the flow rate at a differential pressure of 28 gm/cm² would be 0.38 m³/hr.

A normal test-period would be 72 to 96 hours. Total flow would be integrated over this period of time. Flow orifice opening time would be measured to within one second.

In determining the flow rate, a first order approximation can be made concerning the diameter of the leak as follows:

$D = (1.536 \div (\text{Flow Rate} \div (\rho\Delta P)^{\frac{1}{2}}))^{\frac{1}{2}}$ where D = Diameter of Leak Size (in mm)
$\rho$ = Density of Gas in gm/cm³
$\Delta P$ = Pressure Differential in gm/cm²

Therefore, for a $\rho$ of 0.0015 gm/cm³ (at 109° F.), an approximate hole diameter would be 1.7 mm for 0.38 m³/hr. (the calculation above).

Although the system of the present invention has been specifically set forth in the above disclosure, it is to be understood that modifications and variations can be made thereto which would still fall within the scope and coverage of the appended claims.

We claim:

1. A system for detecting leaks in the barrier (130) separating the primary (140) and the secondary (120) insulation spaces disposed around a cryogenic storage tank (10), said system comprising:
   means (200) for storing an inert gas,
   first means (120) connected to said storing means (200) and to said primary insulation space (140) for supplying and maintaining said inert gas at a first predetermined pressure ($P_{NP}$) in said primary insulation space (140),
   means (230) connected to said primary insulation space (140) for exhausting said inert gas from said primary insulation space (140) to maintain said first predetermined pressure ($P_{NP}$),
   second means (220) connected to said storing means (200) and to said secondary insulation space (120) for supplying and maintaining said inert gas at a second predetermined pressure ($P_{NS}$) in said secondary insulation space (120),
   means (240) connected to said secondary insulation space (120) for exhausting said inert gas from said secondary insulation space (120) to maintain said secondary predetermined pressure ($P_{NS}$), and
   means (250) connected to said first supplying means (210) and to said primary insulation space exhausting means (230) for determining any primary flow difference between the total mass flow of said inert gas into and out from said primary insulation space (140) during a period of time, said determining means (250) being further connected to said second supply means (220) and to said secondary insulation space exhausting means (240) for calculating any secondary flow difference between the total mass flow of said inert gas into and out from said secondary insulation space (120) during said period of time, said primary and secondary flow differences being indicative of a leak present in said secondary barrier (130).

2. The system of claim 1 wherein said determining means (250) comprises:
   first means (710) interconnected with said first supplying means (210) for measuring the flow of said inert gas into said primary insulation space (140),
   second means (730) interconnected with said primary insulation space exhausting means (230) for measuring the flow of said inert gas out from said primary insulation space (140),
   third means (810) interconnected with said second supplying means (220) for measuring the flow of said inert gas into said secondary insulation space (120),
   fourth means (840) interconnected with said secondary insulation exhaust means (240) for measuring the flow of said inert gas out from said secondary insulating space (120), and
   means (250) cooperative with said first, second, third and fourth measuring means for calculating said primary and secondary flow differences.

3. The system of claim 2 wherein said determining means further comprises:
   means for measuring the pressure ($P_N$) and temperature ($T_N$) of said inert gas from said storing means.

4. The system of claim 3 wherein said determining means further comprises:
   means connected to said primary insulation space exhaust means for measuring the pressure ($P_P$) and temperature ($T_P$) of the inert gas therein.

5. The system of claim 3 wherein said determining means further comprises:
   means connected to said secondary insulation space for measuring the pressure ($P_S$) and temperature ($T_S$) of the inert gas therein.

6. The system of claim 2 wherein said determining means (250) further comprises:
   means (280) for measuring atmospheric pressure.

7. A system of detecting leaks in the barrier (130) separating the primary (140) and the secondary (120) insulation spaces disposed around a cryogenic storage tank (10), said system comprising:
   means (200) for storing an inert gas,
   first means (210) connected to said storing means (200) and to said primary insulation space (140) for supplying and maintaining said inert gas at a first predetermined pressure ($P_{NP}$) in said primary insulation space (140),
   means (230) connected to said primary insulation space (140) for exhausting said inert gas from said primary insulation space (140) to maintain said first predetermined pressure ($P_{NP}$),
   second means (220) connected to said storing means (200) and to said secondary insulation space (120) for supplying and maintaining said inert gas at a second predetermined pressure ($P_{NS}$) in said secondary insulation space (120),
   means (240) connected to said secondary insulation space (120) for exhausting said inert gas from said secondary insulation space (120) to maintain said secondary predetermined pressure ($P_{NS}$),
   means (710) interconnected with said first supplying means (210) for measuring the primary flow of said inert gas into said primary insulation space (140),
   means (730) interconnected with said primary insulation space exhausting means (230) for measuring the primary flow of said inert gas out from said primary insulation space (140),
   means (810) interconnected with said second supplying means (220) for measuring the secondary flow of said inert gas into said secondary insulation means (120),
   means (840) interconnected with said secondary insulation exhaust means (240) for measuring the secondary flow of said inert gas out from said secondary insulation means (120),
   means for measuring and generating signals proportional to the pressure ($P_N$) and temperature ($T_N$) of said inert gas in said storing means,
   means connected to said primary insulation space exhaust means for measuring and generating signals proportional to the pressure ($P_P$) and temperature ($T_P$) of the inert gas therein,
   means connected to said secondary insulation space for measuring and generating signals proportional to the pressure ($P_S$) and temperature ($T_S$) of the inert gas, and
   means (250) receptive of said primary flow-in, primary flow-out, secondary flow-in, and secondary flow-out measurements, and of said $P_N$, $T_N$, $P_P$, $T_P$, $P_S$ and $T_S$ signals for determining any differences in said primary and secondary flows, said primary and secondary flow differences being indicative of a leak being present in said secondary barrier (130).

8. A system for detecting leaks in the secondary barrier (130) between the primary and secondary insulation spaces (140 and 120) of a cryogenic cargo tank (10), said system comprising:

means (200) for storing inert gas, means (210, 220, 230, 240) connected to said storing means (200) for maintaining a first predetermined pressure ($P_{NP}$) of inert gas in said primary insulation space (140) and a second predetermined pressure ($P_{NS}$) in said secondary insulation space (120), and means (250) connected to said maintaining means (210, 220, 230, 240) for determining the flow of said inert gas into and out from said primary (140) and secondary (120) spaces over a period of time, said determining means (250) being capable of measuring any differences in the flow rates in and the flow rates out of each of said insulation spaces, said differences in flow rates being indicative of a leak in said secondary barrier (130).

9. The system of claim 8 further comprising:

means (940) in said secondary insulation space (120) for detecting the presence of oxygen therein as a result of an atmospheric leak to said secondary insulation space (120).

10. The system of claim 8 further comprising:

means (930) in said primary insulation space (140) for detecting the presence of cargo gas therein as a result of a leak from the cargo tank.

11. A system for detecting leaks in the primary barrier (150), the secondary barrier (130), and the inner hull of the primary and secondary insulation spaces (140 and 120) of a cryogenic cargo tank (10) carrying liquified natural gas in a transport ship (20), said system comprising:

means (200, 210, 230) interconnected with said primary insulation space (140) for supplying and maintaining an inert gas at a first predetermined pressure ($P_{NP}$) in said primary insulation space (140), said first predetermined pressure ($P_{NP}$) being less than the pressure of said liquified natural gas ($P_{CH4}$), means (510, 250) in fluid communication with said primary insulation space for monitoring said inert gas therein for the presence of any gas from said liquified natural gas in the cargo tank (10) due to a leak (520) in said primary barrier (150), means (200, 220, 240) interconnected with said secondary insulation space (120) for supplying and maintaining an inert gas at a second predetermined pressure ($P_{NS}$) in said secondary insulation space (120), said second predetermined pressure ($P_{NS}$) being less than the said first predetermined pressure ($P_{NP}$) and being less than atmospheric pressure ($P_O$), means (410, 250) in fluid communication with said secondary insulation space (120) for monitoring said inert gas therein for the presence of any oxygen from the atmosphere due to a leak (420) in said inner hull (110), and means (250) interconnected with said primary and secondary insulation spaces (140, 120) for determining the flow of said inert gas, into and out from said primary and secondary spaces (140, 120) over a period of time, said determining means being capable of measuring any differences in the flow rates in and the flow rates out of each of said insulation spaces, said differences in flow rates being indicative of a leak (600) in said secondary barrier (130).

12. A system for detecting and approximating the size of leaks in the barrier (130) separating the primary (140) and the secondary (120) insulation spaces disposed around a cryogenic storage tank (10), said system comprising:

means (200) for storing an inert gas, first means (120) connected to said storing means (200) and to said primary insulation space (140) for supplying and maintaining said inert gas at a first predetermined pressure ($P_{NP}$) in said primary insulation space (140), means (230) connected to said primary insulation space (140) for exhausting said inert gas from said primary insulation space (140) to maintain said first predetermined pressure ($P_{NP}$), second means (220) connected to said storing means (200) and to said secondary insulation space (120) for supplying and maintaining said inert gas at a second predetermined pressure ($P_{NS}$) in said secondary insulation space (120), means (240) connected to said secondary insulation space (120) for exhausting said inert gas from said secondary insulation space (120) to maintain said secondary predetermined pressure ($P_{NS}$), and means (250) connected to said first supplying means (210) and to said primary insulation space exhausting means (230) for determining any primary flow difference between the total mass flow of said inert gas into and out from said primary insulation space (140) during a period of time, said determining means (250) being further connected to said second supply means (220) and to said secondary insulation space exhausting means (240) for calculating any secondary flow difference between the total mass flow of said inert gas into and out from said secondary insulation space (120) during said period of time, said primary and secondary flow differences being indicative of a leak present in said secondary barrier (130) and the size of said leak.

13. A system of detecting and approximating the size of said leak in the barrier (130) separating the primary (140) and the secondary (120) insulation spaces disposed around a cryogenic storage tank (10), said system comprising:

means (200) for storing an inert gas, first means (210) connected to said storing means (200) and to said primary insulation space (140) for supplying and maintaining said inert gas at a first predetermined pressure ($P_{NP}$) in said primary insulation space (140), means (230) connected to said primary insulation space (140) for exhausting said inert gas from said primary insulation space (140) to maintain said first predetermined pressure ($P_{NP}$), second means (220) connected to said storing means (200) and to said secondary insulation space (120) for supplying and maintaining said inert gas at a second predetermined pressure ($P_{NS}$) in said secondary insulation space (120), means (240) connected to said secondary insulation space (120) for exhausting said inert gas from said secondary insulation space (120) to maintain said secondary predetermined pressure ($P_{NS}$), means (710) interconnected with said first supplying means (210) for measuring the primary flow of said inert gas into said primary insulation space (140), means (730) interconnected with said primary insulation space exhausting means (230) for measuring the primary flow of said inert gas out from said primary insulation space (140), means (810) interconnected with said second supplying means (220) for measuring the secondary flow of said inert gas into said secondary insulation means (120), means (840) interconnected with said secondary insulation exhaust means (240) for measuring the secondary flow of said inert gas out from said secondary insulation means (120), means for measuring and generating signals proportional to the pressure ($P_N$) and temperature ($T_N$) of said inert gas in said storing means, means connected to said primary insulation space exhaust means for measuring and generating signals proportional to the pressure ($P_P$) and temperature ($T_P$) of the inert gas therein, means connected to said secondary insulation space for measuring and generating signals proportional to the pressure ($P_S$) and temperature ($T_S$) of the inert gas, and means (250) receptive of said primary flow-in, primary flow-out, secondary flow-in, and secondary flow-out measurements, and of said $P_N$, $T_N$, $P_P$, $T_P$, $P_S$ and $T_S$ signals for determining any differences in said primary and secondary flows, said primary and secondary flow differences being indicative of a leak being present in said secondary barrier (130) and the size of said leak.

14. A system for approximating the size of leaks in the secondary barrier (130) between the primary and secondary insulation spaces (140 and 120) of a cryogenic cargo tank (10), said system comprising:

means (200) for storing inert gas, means (210, 220, 230, 240) connected to said storing means (200) for maintaining a first predetermined pressure ($P_{NP}$) of inert gas in said primary insulation space (140) and a second predetermined pressure ($P_{NS}$) in said secondary insulation space (120), and means (250) connected to said maintaining means (210, 220, 230, 240) for determining the flow of said inert gas into and out from said primary (140) and secondary (120) spaces over a period of time, said determining means (250) being capable of measuring any differences in the flow rates in and the flow rates out of each of said insulation spaces, said differences in flow rates being indicative of the size of a leak in said secondary barrier (130).

15. A system of approximating the size of leaks in the secondary barrier (130) between the primary and secondary insulation spaces (140 and 120) of a cryogenic cargo tank (10), said system comprising:

means (200) for storing inert gas, means (210, 220, 230, 240) connected to said storing means for delivering said inert gas to said primary and secondary insulation spaces (140 and 120), and means (250) connected to said delivering means (210, 220, 230 and 240) for determining the flow of said inert gas into and out from said primary and secondary insulation spaces, said flow rates being indicative of the approximate, first order, size of any leak in said secondary barrier (130).

* * * * *

UNITED STATES PATENT AND TRADEMARK OFFICE
CERTIFICATE OF CORRECTION

PATENT NO. : 4,404,843
DATED : September 20, 1983
INVENTOR(S) : Irvin D. Johnson, Gary M. Timlin, Robert D. Yuill It is certified that error appears in the above-identified patent and that said Letters Patent are hereby corrected as shown below:

Page 1, line 10: In the Abstract, delete "$(P_{CH_4})$", and insert --$(P_{CH_2})$--.

Figures 4,5,6: Delete "$P_{CH}$" and insert --$P_{CH_4}$--.

Figure 5: Delete "CH" and insert --$CH_4$--.

Figure 9: Delete "$CH_2$" and insert --$CH_4$--.

Col. 3, line 58: Delete "in" and insert --at--.

Col. 3, line 61: At second occurrence, delete "and" and insert --an--.

Col. 7, line 22: Delete "52" and insert -- -52 --.

Signed and Sealed this

Third Day of January 1984

[SEAL]

Attest:

GERALD J. MOSSINGHOFF

Attesting Officer

Commissioner of Patents and Trademarks